(12) United States Patent
Mohanty et al.

(10) Patent No.: US 8,061,422 B2
(45) Date of Patent: Nov. 22, 2011

(54) PROCESS FOR ENHANCING THE PRODUCTION OF OIL FROM DEPLETED, FRACTURED RESERVOIRS USING SURFACTANTS AND GAS PRESSURIZATION

(75) Inventors: Kishore Kumar Mohanty, Houston, TX (US); Bhargaw Adibhatla, Houston, TX (US)

(73) Assignee: University of Houston System, Houston, TX (US)

( * ) Notice: Subject to any disclaimer, the term of this patent is extended or adjusted under 35 U.S.C. 154(b) by 341 days.

(21) Appl. No.: 12/371,855

(22) Filed: Feb. 16, 2009

(65) Prior Publication Data

US 2009/0205823 A1    Aug. 20, 2009

Related U.S. Application Data

(60) Provisional application No. 61/028,667, filed on Feb. 14, 2008.

(51) Int. Cl.
*E21B 43/22* (2006.01)
*E21B 43/40* (2006.01)

(52) U.S. Cl. ............ 166/266; 166/270.1; 166/275; 166/400

(58) Field of Classification Search ............ None
See application file for complete search history.

(56) References Cited

U.S. PATENT DOCUMENTS

| | | | | | |
|---|---|---|---|---|---|
| 2,792,894 | A | * | 5/1957 | Graham et al. | 166/268 |
| 3,107,726 | A | * | 10/1963 | Greenwald | 166/266 |
| 3,288,212 | A | * | 11/1966 | O'Brien et al. | 166/245 |
| 3,490,527 | A | * | 1/1970 | Cook et al. | 166/245 |
| 3,498,378 | A | * | 3/1970 | Graham et al. | 166/263 |
| 3,548,941 | A | * | 12/1970 | Graham et al. | 166/270.1 |
| 3,637,017 | A | * | 1/1972 | Gale et al. | 166/270.1 |
| 4,364,431 | A | * | 12/1982 | Saidi et al. | 166/275 |
| 4,765,910 | A | * | 8/1988 | Wolf | 210/708 |
| 4,842,065 | A | * | 6/1989 | McClure | 166/270.1 |

* cited by examiner

*Primary Examiner* — George Suchfield
(74) *Attorney, Agent, or Firm* — Conley Rose, P.C.

(57) ABSTRACT

A method for enhancing the production of liquid hydrocarbons from oil-wet, fractured reservoirs comprising injecting a surfactant solution into the reservoir, pressurizing the reservoir, maintaining the pressure, and recovering liquid hydrocarbons. In an embodiment, the method comprises closing production wells for a period to maintain reservoir pressure and surfactant exposure within the matrix.

19 Claims, 8 Drawing Sheets

PROCESS FOR ENHANCING THE PRODUCTION OF OIL FROM DEPLETED, FRACTURED RESERVOIRS USING SURFACTANTS AND GAS PRESSURIZATION

CROSS-REFERENCES TO RELATED APPLICATIONS

This application claims benefit of U.S. Provisional Application Ser. No. 61/028,667 filed on Feb. 14, 2008, entitled "Process for Enhancing the Production of Oil from Depleted, Fractured Reservoirs Using Surfactants and Gas Pressurization" which is hereby incorporated herein by reference in its entirety.

STATEMENT REGARDING FEDERALLY SPONSORED RESEARCH OR DEVELOPMENT

Not Applicable.

REFERENCE TO A SEQUENTIAL LISTING

Not Applicable.

BACKGROUND

1. Field of the Invention

The present invention relates generally to oil recovery. More specifically, the invention relates to a means of recovering oil from fractured reservoirs.

2. Description of the Related Art

The current oil drilling and pumping technologies and processes have successfully recovered large quantities of oil from un-fractured underground reservoirs. However, current technology fails to recover oil, natural gas, and other fuels trapped in fractured or discontinuous reservoirs in an efficient manner. In certain instances, the conventional technology lacks methods to recover oil in certain reservoirs.

Particularly, conventional technology fails to recover oil in fractured carbonate reservoirs. Carbonate reservoirs are formed as sedimentary rocks deposited in static marine environments. The static formation of the rocks leads to diagenesis, or any chemical, physical, or biological change undergone by sediments after initial deposition, as well as during and after lithification. Fractured carbonate reservoirs typically result from severe diagenesis. The diagenetically altered sediment results in heterogeneous carbonate grain matrix within a rock formation or underground structure. Further, the porosity of the carbonate reservoir results in at least three morphological classifications including, connected porosity, fracture porosity, and vugs. These classifications result in a complex flow path for the oil in the reservoir, and inhibit efficient oil production. Other reservoir formations, such as stylolite structures form flow barriers within the reservoir, inhibiting recovery of the liquid hydrocarbons, such as oil.

The wettability of the carbonate reservoir structure may further interfere with efficient oil recovery in conventional techniques. The carbonate matrix comprising the reservoir may have increased adhesive properties with certain oils. The increased adhesion of oil is termed oil-wet or mixed-wet. The oil in these instances adheres more strongly to the geological formations in the reservoir and impedes recovery. The wettability of the carbonates determines the efficiency of water, and pressurized steam methods for recovery of oil in the reservoir. The wettability of may cause the fluids used in these techniques to flow through water-wet regions of the reservoir and thereby fail to recover oil that is adhering to the underground formations.

About eighty percent of carbonate reservoirs are oil-wet or mixed-wet, most of which are also fractured. Secondary recovery using conventional water flooding methods are not effective in recovering oil from the matrix because oil tends to adhere strongly to the reservoir matrix; it recovers oil from only the fractures. Other existing processes to improve recovery rates such as the injection of surfactant solutions into rock fractures are limited because surfactant solutions do not efficiently diffuse into the matrix, if the fracture spacing is large.

Consequently, there is a need in the industry for a process for oil recovery from oil-wet and mixed-wet fractured reservoirs, in order to achieve maximum oil production. Further, there is a need to enhance oil recovery in oil-wet and mixed-wet fractured reservoirs, particularly in cases where primary oil production has led to gas formation in the reservoir.

BRIEF SUMMARY

A method for recovering liquid hydrocarbons from an underground reservoir, comprising closing production wells, to form a sealed reservoir, injecting a first surfactant solution into the reservoir, wherein the first surfactant increases the pressure in the reservoir, maintaining the sealed reservoir, to maintain increased pressure, opening production wells, wherein production wells remove the released liquid hydrocarbons, injecting a second surfactant solution into the reservoir, removing liquid hydrocarbons, the first surfactant solution, and the second surfactant solution from the reservoir, recycling the first surfactant solution and the second surfactant solution, and recovering the liquid hydrocarbons.

A method for accessing liquid hydrocarbons in a fractured reservoir, comprising, injecting at least one surfactant solution into a fractured reservoir, wherein production wells fluidly coupled with the fractured reservoir are closed, and wherein the at least one surfactant solution decreases the gas space to increase pressure in the fractured reservoir, maintaining the increased pressure in the fractured reservoir, wherein the increased pressure promotes surfactant penetration into matrix of the fractured reservoir, opening at least one production well such that the liquid hydrocarbons and surfactants may be recovered from the fractured reservoir, wherein additional surfactant solutions are injected into the fractured reservoir to maintain pressure, and the recovered surfactants are recycled for re-injection into the fractured reservoir, and repeating the steps of injecting the surfactant solution, maintaining an increased pressure, and opening production wells until the hydrocarbons in the carbonate fractured are exhausted.

A method for accessing liquid hydrocarbons in a carbonate matrix reservoir, comprising: injecting at least one surfactant solution into a carbonate matrix reservoir, wherein production wells fluidly coupled with the carbonate matrix reservoir are closed, and wherein the at least one surfactant decreases the gas space to increase pressure in the carbonate matrix reservoir, maintaining the increased pressure in the carbonate matrix reservoir, wherein the increased pressure promotes surfactant penetration into geological formations of the carbonate matrix reservoir, opening at least one production well such that the liquid hydrocarbons and surfactants may be recovered from the carbonate matrix reservoir, wherein additional surfactant solutions are injected into the carbonate matrix reservoir to maintain pressure, and the recovered surfactants are recycled for re-injection into the carbonate matrix reservoir, and repeating the steps of injecting the surfactant solution, maintaining an increased pressure, and opening production wells until the hydrocarbons in the carbonate matrix reservoir are exhausted.

A method for underground liquid hydrocarbon management, comprising: injecting a first surfactant solution into an underground reservoir, wherein the first surfactant releases liquid hydrocarbons from geological formations in the reservoir, forming a sealed reservoir, wherein the production wells in fluid communication with the underground reservoir are closed for a predetermined duration of time, opening at least one production well, to remove the released liquid hydrocarbons, the removed liquid hydrocarbon volume being offset by injecting a second surfactant solution into the reservoir, repeating steps of injecting a first surfactant, forming a sealed reservoir, and opening production well, in alternate locations within the reservoir, in order to directionally control the flow of the first surfactant, the second surfactant, and the liquid hydrocarbons through the reservoir, recycling the first surfactant solution and the second surfactant solution.

Thus, embodiments described herein comprise a combination of features and advantages intended to address various shortcomings associated with certain prior devices. The various characteristics described above, as well as other features, will be readily apparent to those skilled in the art upon reading the following detailed description of the preferred embodiments, and by referring to the accompanying drawings.

BRIEF DESCRIPTION OF THE FIGURES

For a detailed description of the preferred embodiments of the invention, reference will now be made to the accompanying drawings in which.

NOTATION AND NOMENCLATURE

Figure 1A:
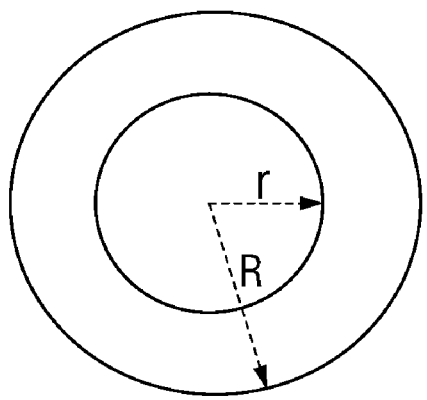
FIG. 1A illustrates a schematic of the radial coordinates of a cylindrical core with radius R.

Certain terms are used throughout the following descriptions and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection In the following discussion and in the claims the term "geological formation(s)" is used to refer to underground rock and/or earth features, structures, formations, traps, and passageways that form an underground reservoir.

In the following discussion and in the claims, the term "matrix", "geological matrix", "reservoir matrix", and "rock matrix" are used interchangeably to refer to the mineral composition and physical structure of the rock and/or earth features that form an underground reservoir.

In the following discussion and in the claims, the terms "hydrocarbons", "liquid hydrocarbons", and "gaseous hydrocarbons" are used to refer to the compositions of petroleum, oil, tar, natural gases, other compounds, and derivatives found in subterranean hydrocarbon traps, hydrocarbon reservoirs, and other geological formations.

In the following discussion and in the claims, the term "bubble point" and "bubble point pressure" are used to refer to the gas pressure of an underground reservoir, below which volatile compounds trapped in a liquid form bubbles.

DETAILED DESCRIPTION

The present disclosure relates to a process to enhance liquid hydrocarbon, or oil, recovery from mixed-wet and oil-wet, fractured reservoirs. Further, the process relates to recovering liquid hydrocarbons from an underground reservoir, where production wells have recovered sufficient liquid hydrocarbons that the pressure in the reservoir has decreased below the bubble point. The bubble point may comprise the point at which gaseous particles trapped in the liquid hydrocarbons form bubbles. In embodiments, the system for the disclosed process comprises at least one injector well configured for delivering materials, such as, but not limited to, liquids, or gases to the underground reservoir. Further, the system comprises at least one production well for removing the liquid hydrocarbons. In certain instances, the production well comprises an apparatus for pumping, pulling, or otherwise removing liquid and/or gaseous hydrocarbons from an underground reservoir. Further, the system may comprise any conventional drilling, pumping, and processing infrastructure as understood by one skilled in the art.

Generally, the process comprises the steps of injecting a surfactant solution into the reservoir, allowing the surfactant to penetrate the reservoir matrix, activating production wells, and maintaining an inflow of surfactant. In certain instances, the surfactant is injected into the reservoir while the wells are sealed or closed. Further, it may be considered that operationally, the production wells are not actively removing the liquid hydrocarbons. The closed wells result in compression of the existing gases in the reservoir, and an increase in surfactant penetration into the reservoir's geological matrix. By allowing the surfactant to penetrate the reservoir matrix, the surfactant moves into the reservoir matrix and releases hydrocarbons, which flow into the reservoir. The next step comprises opening the production wells in order to remove the released hydrocarbons in the reservoir. During this step, the reservoir is maintained at increased pressure by injecting additional surfactant(s). Maintaining the increased pressure in the reservoir maximizes surfactant diffusion throughout the reservoir, maximizes surfactant exposure to distant portions of the reservoir, and increases penetration into the reservoir matrix. In certain instances, the process may be repeated using alternative, or multiple, surfactants to maximize liquid hydrocarbon recovery. Further, the process may be repeated until liquid hydrocarbon recovery ceases. Alternatively, the process is repeated until it is economically unfeasible to continue injecting surfactants, operating equipment, or economic factors change.

Surfactant Injection. In certain instances, the first step of the process comprises injecting surfactants into the reservoir. Examples of geological formations in the reservoir comprise sedimentary rocks, limestone, sandstone, carbonates, and the like without limitation. Additionally in certain embodiments, the formation may comprise a carbonate formation with at least one of the three morphological classifications connected porosity, fracture porosity, stylolites, fractures, and vugs. Further, the reservoir may comprise a complex heterogeneous formation comprising a plurality of the described structures. During the surfactant injection and hydrocarbon removal processes the formation may change. In certain instances, the surfactant injection is positioned within distant parts of the reservoir in order to maximize recovery from the reservoir. Further, the geological formation may create fracture blocks that isolate volumes of liquid hydrocarbons not directly accessible by conventional recovery means.

As understood by one skilled in the art, the surfactant alters the adhesion of the liquid hydrocarbons to the geological formations in the reservoir. Further, the surfactant alters the wettability between the liquid hydrocarbons and the rock matrix. In further embodiments, the surfactants may be considered to alter the surface tension of the liquid hydrocarbons in the reservoir. Without wishing to limited by any theory, the surfactant changes the adhesion from oil-wet to water-wet. Exemplary surfactants may comprise, but are not limited to, anionic surfactants, cationic surfactants, non-ionic surfactants, and silanes. Additionally, the surfactant solution may include salts, and/or electrolytes as known to one skilled in the art. Further, the surfactant solution may comprise an alkali, an alkali salt, or other basic, ionic compounds, without limitation. In certain instances, the surfactant is customized. As understood by one skilled in the art, surfactant customization is dependent upon reservoir characteristics such as, but not limited to, the composition of the liquid hydrocarbons, the composition of reservoir brine, the reservoir depth, the composition of reservoir geology, the temperature of the reservoir, the liquid hydrocarbons, and/or the production well apparatus.

In embodiments, the injection step is conducted with the production wells closed. As understood by one skilled in the art, closed may refer to a state preventing the removal of gases or liquids from the reservoir. Further, the step of closing the wells and/or keeping the wells closed during the injection step fixes the volume inside the reservoir. As surfactant is injected into the reservoir, gases cannot escape. In certain instances, the surfactant is injected into the reservoir under increased pressure. Without wishing to be limited by theory, the liquids injected into the reservoir, such as the surfactant solution, and the liquid hydrocarbons therein are incompressible. Continued introduction of surfactant decreases the gaseous volume of the reservoir and compresses the gaseous compounds inside the reservoir. The compression of the gas results in an increased pressure within the reservoir. In certain instances, the compression of the gas creates a high pressure within the reservoir.

In embodiments, the high pressure of the gaseous compounds within the reservoir is maintained. Allowing the high pressure within the reservoir to remain may aid in surfactant diffusion throughout the reservoir. Further, the pressure may aid in surfactant penetration into fracture blocks, and/or may force the surfactant solution deep inside the carbonate fracture blocks, reaching pools of liquid hydrocarbons that were previously inaccessible. Further, the high pressure in the reservoir may shift certain geological features and improve access of the surfactant to the liquid hydrocarbons.

As previously discussed, the surfactant alters the interaction between the liquid hydrocarbons and the geological formations or matrix. The altered adhesive interactions allow the surfactant solution to strip the liquid hydrocarbons from the matrix. Further, the surfactant solution may act to transport the liquid hydrocarbons through the reservoir to a production well. In certain instances, the surfactant solution may collect oil at the top of fracture blocks within the reservoir. Alternatively, the surfactant increases the volume of fluids in the reservoir, such that the liquid hydrocarbons are capable of passing over certain flow diversion structures, such as stylolites. The surfactant used in conjunction with the high gas pressure, may improve liquid hydrocarbon (such as oil) recovery at the top of the carbonate fractures.

Hydrocarbon Recovery. In embodiments, the production wells are opened in order to recover or remove the liquid hydrocarbons that are released from the reservoir matrix. In embodiments, the production wells are operated in conventional fashion. Alternatively, production wells are drilled to reach certain pockets of freed hydrocarbons within the reservoir. Further, production well inlets may be positioned at, or near, the deepest portion of the reservoir. Alternatively, the production well inlets may be positioned at the top of the reservoir.

The production wells may further comprise infrastructure and apparatus configured to remove the liquid hydrocarbons from the reservoir. In certain instances, the production wells may comprises an injector well positioned nearby. As understood by one skilled in the art, injecting additional gas and/or liquid compounds into the reservoir may improve recovery and removal operations. Alternative means for improving hydrocarbon flows to the production wells may be incorporated without limitation.

During hydrocarbon recovery, the production wells may be closed for intermittent durations. Further, the production wells in one portion of the reservoir may be closed at alternate times compared to those located in another portion of the reservoir. As understood by one skilled in the art of reservoir management and flow control, alternative production wells may improve efficiency of the liquid hydrocarbon recovery. The temporary relief and reapplication of pressure within the reservoir may create waves of surfactant that reach further formations. Alternatively, differential production-well control may allow the surfactant improved penetration into geological formations within the reservoir. Further, the relief and reapplication of the high pressure may improve liquid hydrocarbon flow to the production well or wells. Additionally, this technique may allow liquid hydrocarbon and surfactant to flow over or around stylolites and other flow inhibitors known to one skilled in the art.

Pressure Maintenance. In embodiments, the pressure within the reservoir is maintained at about an increased level. In certain instances, high-pressure gas or fluids are injected into the reservoir to maintain an increased pressure. Further, the high-pressure gas or liquid may comprise a surfactant. The injected gases or surfactants are injected at a rate that is about the same as the rate at which liquid hydrocarbons that are recovered from the production wells. As understood by one skilled in the art, injecting a pressurized gas may maintain the reservoir pressure and keep the pressure above the bubble point of gases in the liquid hydrocarbons.

Preferably, at least one surfactant solution may be injected into the reservoir. Injecting an approximately equivalent quantity, or volume, of surfactant into the reservoir as the liquid hydrocarbon is recovered may maintain the equivalent pressure. In certain instances, an excess quantity of surfactant is injected into the reservoir to increase the pressure. Further, surfactant recovered from the reservoir may be recycled for further injection.

In certain instances, alternative or multiple surfactants may be injected into the reservoir during the pressure maintenance step. As understood by one skilled in the art, the process of hydrocarbon recovery may alter the wettability of geological and carbonate formations within the reservoir. In addition, as the wettability of the formations change, the accessibility to new fracture blocks and liquid hydrocarbons may improve. In embodiments, injecting additional surfactants may improve hydrocarbon recovery by stripping these hydrocarbon sources from the formations. Additional surfactants may be injected simultaneously or sequentially in order to maximize liquid hydrocarbon recovery. Further, a cycle of surfactants may be repeated until liquid hydrocarbon recovery decreases or ceases.

Repeat Cycles. In embodiments, the process of surfactant injection, liquid hydrocarbon recovery, and pressure maintenance is repeated. Further, any step may be repeated before the continuing along the process. Without wishing to be limited by theory, repeating cycles may increase the liquid hydrocarbon recovery. The entire process, including multiple cycles of each step may be repeated until hydrocarbon recovery ceases. In exemplary embodiments, the process is repeated until only the injected surfactants are recovered. Alternatively, the process is repeated until it is economically unfeasible to continue the injecting surfactants, operating equipment. Further, in certain instances the continuation of operations and repeated cycling of the disclosed process may be determined by economic factors.

To further illustrate various illustrative embodiments of the present invention, the following examples are provided.

EXAMPLE

Example 1

Figure 1B:
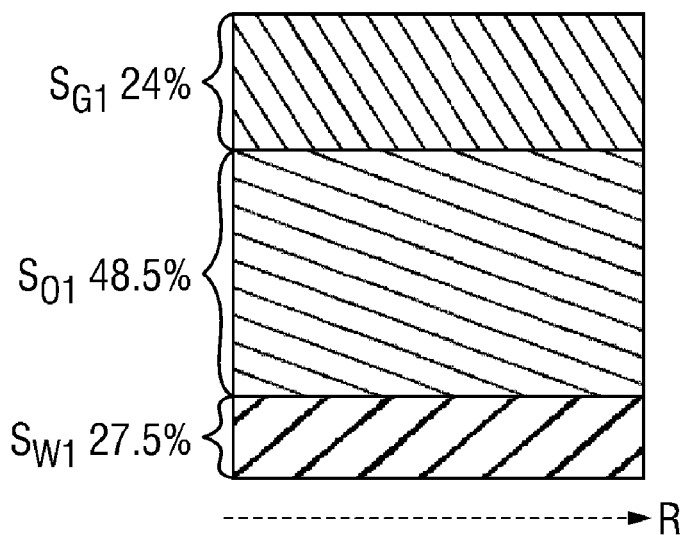
FIG. 1B illustrates the fluid saturation distribution in the core as a function of radius before pressurization with the surfactant solution.
Figure 1C:
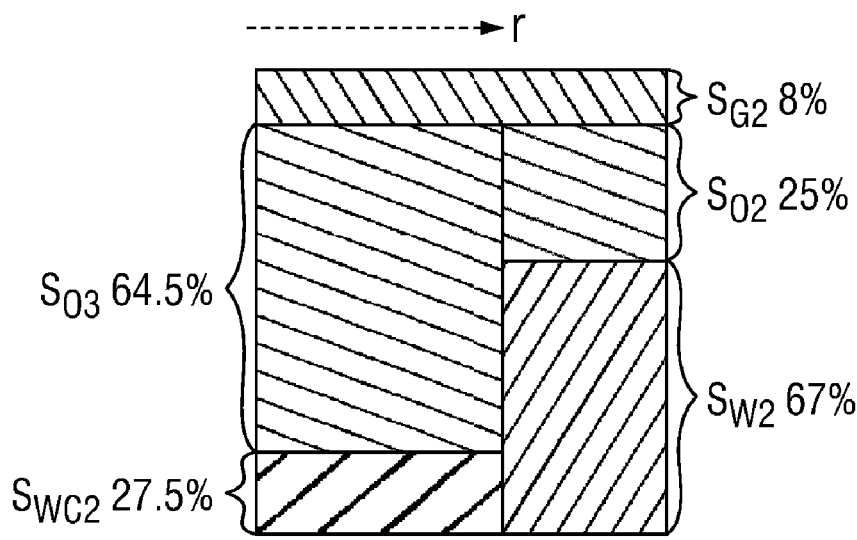
FIG. 1C illustrates the fluid saturation distribution just after the pressurization with the surfactant solution.

FIG. 1 shows a schematic of the simulation system: a laboratory-scale core with a radius R and its saturation before and after compression with an anionic surfactant solution. In this example, a core of dimensions 4 cm in diameter (R=2 cm) and 10 cm in height is initially saturated with oil at a residual water saturation of 27.5%. The core to the boundary, or radius R, is depressurized under primary production below its bubble point to simulate field conditions during primary oil production. The saturations at that stage are 24% gas saturation ($S_{G1}$), 27.5% water saturation ($S_{W1}$) and 48.5% oil saturation ($S_{O1}$) as illustrated in FIG. 1B. The core is then pressurized by an anionic surfactant solution, with the surfactant front at r, to three times the initial pressure such that the gas is compressed to 8% ($S_{G2}$) saturation, as shown in FIG. 1C. The surfactant invades the core uniformly from the sides and the saturation profiles and radius of invasion are shown in FIGS. 1B and 1C. The radius of invasion can be calculated from a simple mass balance. This matrix block, or core, is then surrounded by the surfactant solution and connected to the producing well, opened after the pressure build up and surfactant invasion. Simulations are performed to see the rate of oil recovery and in situ saturation profiles.

Figure 2:
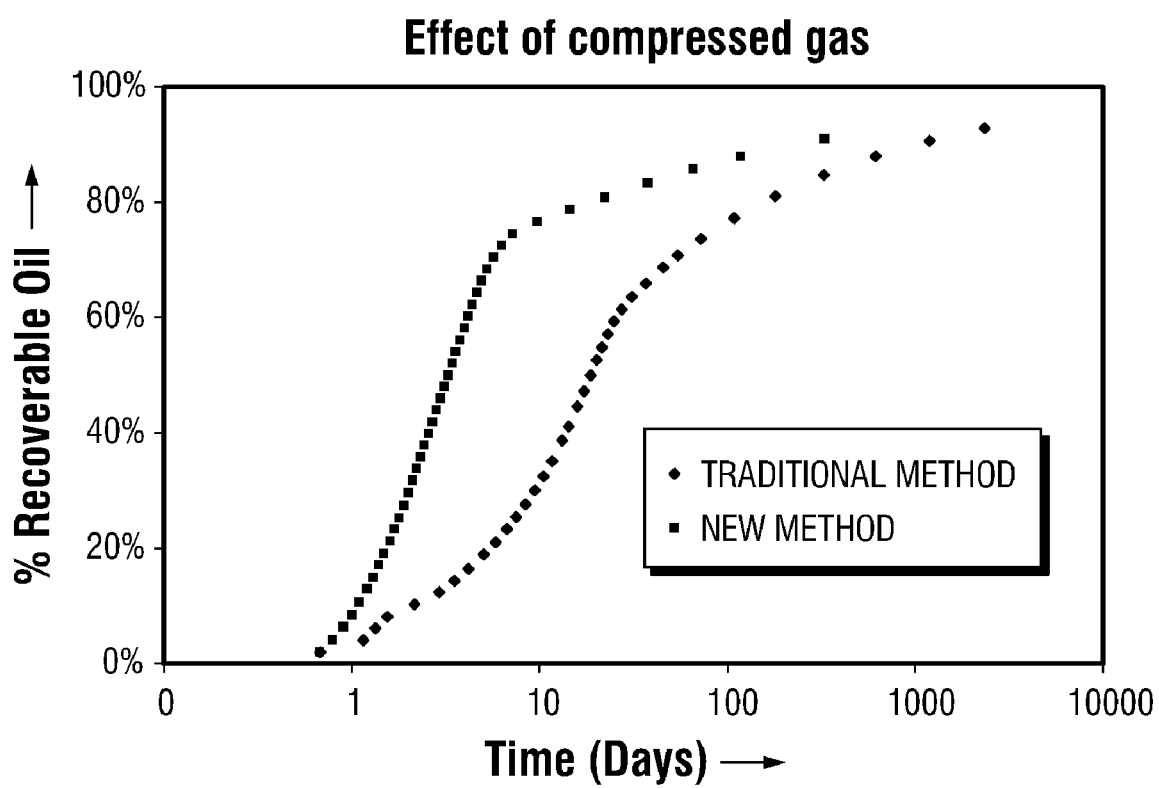
FIG. 2 is the computer simulation output illustrating the effect of compressed gas on the percentage of recovered oil.

FIG. 2 shows the rate of recovery for the present process compared to rate of recovery from the same core in absence of gas. In the case where no gas is present, the surfactant front at t=0 is at the boundary of the core, or radius R. In the case with gas compression, the surfactant front is at r (<R). Thus the surfactant imbibition, wettability alteration and oil recovery process is faster in the gas compression case. The oil relative permeability is higher in the absence of gas than in the case where gas is present. In spite of this higher permeability, FIG. 2 shows that the oil recovery rate is higher in the new process because the initial forced imbibition reduces time for oil recovery. Eighty percent of the recoverable oil is recovered in about ten days compared to about one hundred days using a traditional process.

Example 2

Figure 3A:
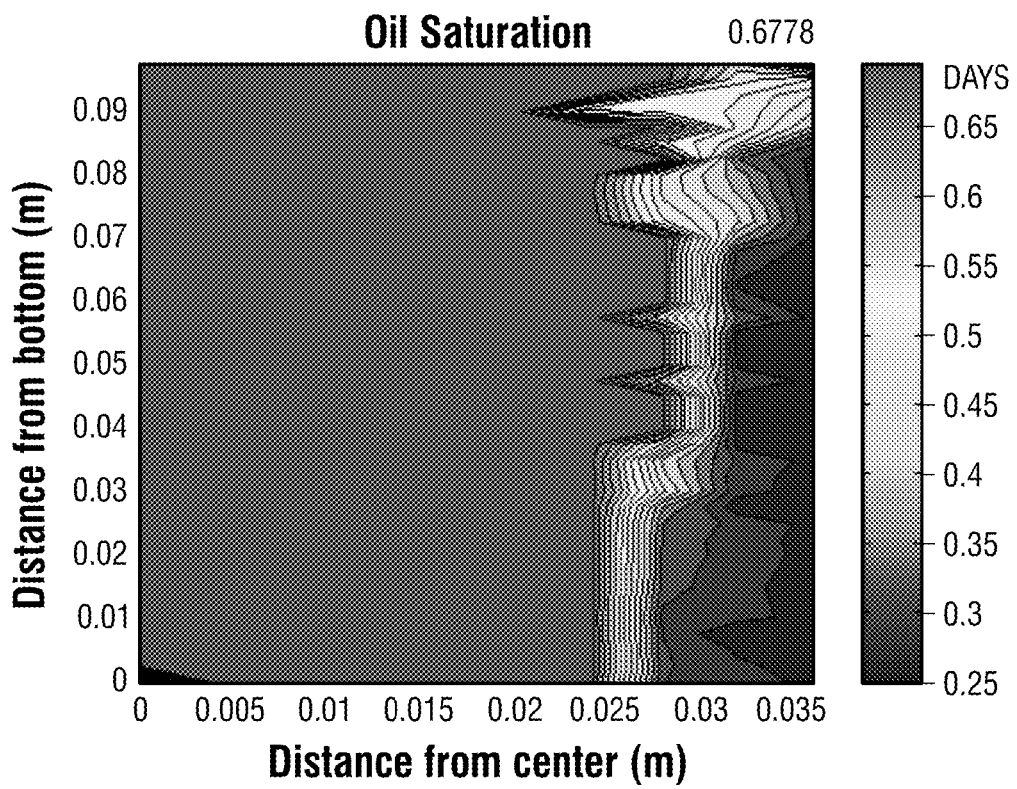
FIG. 3A is a computer simulation result showing oil saturation profile at 0.68 days.
Figure 3B:
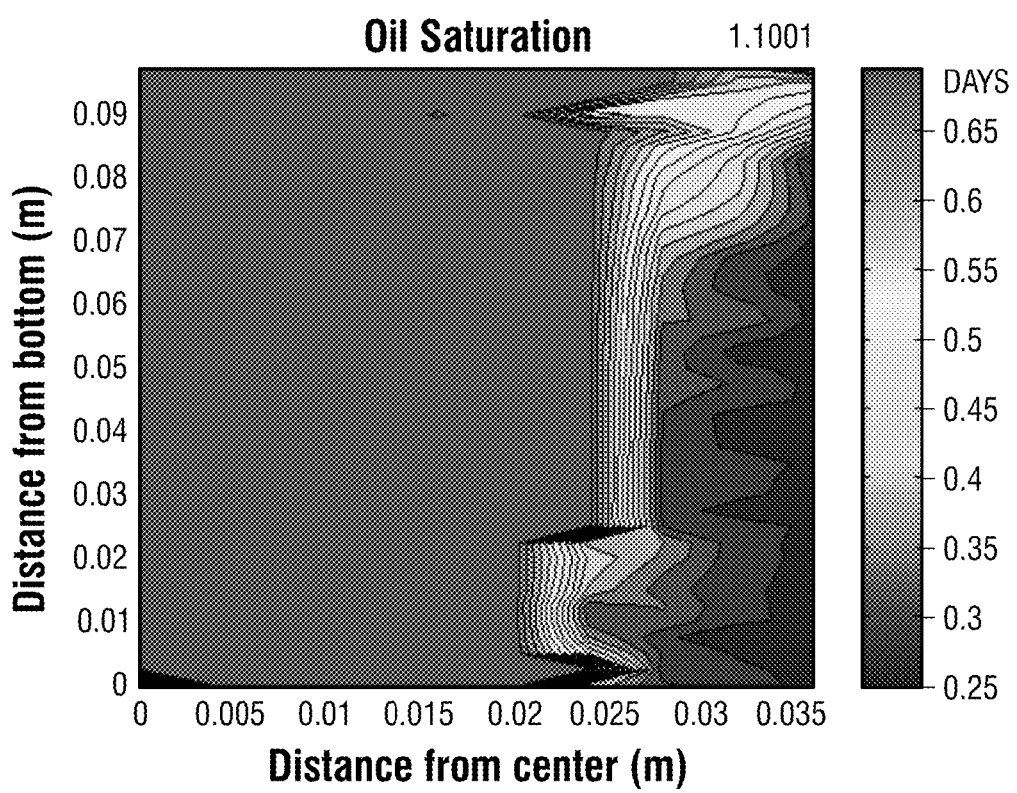
FIG. 3B is a computer simulation result showing oil saturation profile at 1.10 days.
Figure 3C:
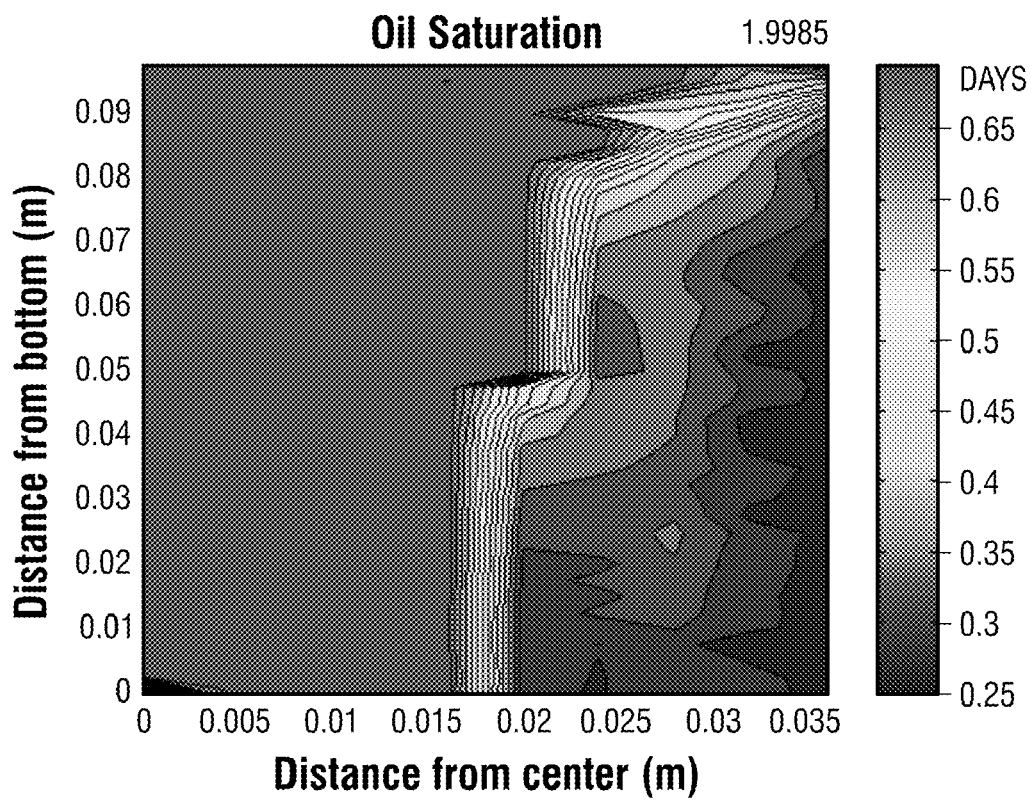
FIG. 3C is a computer simulation result showing oil saturation profile at 1.99 days.
Figure 3D:
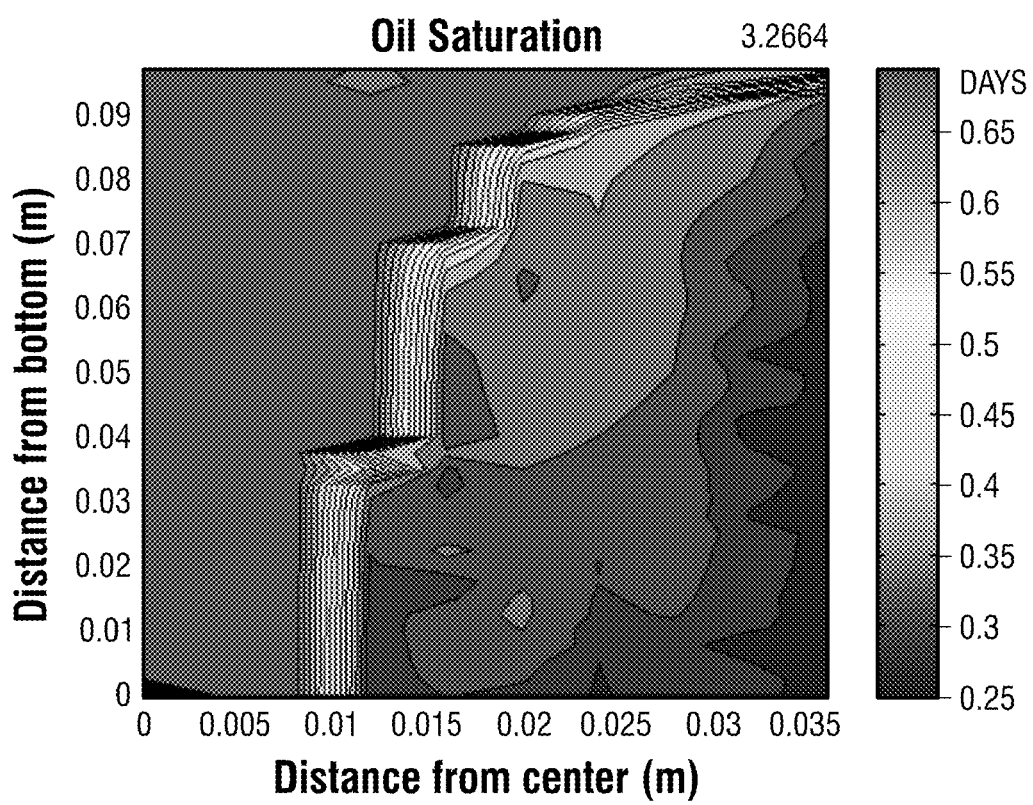
FIG. 3D is a computer simulation result showing oil saturation profile at 3.27 days
Figure 3E:
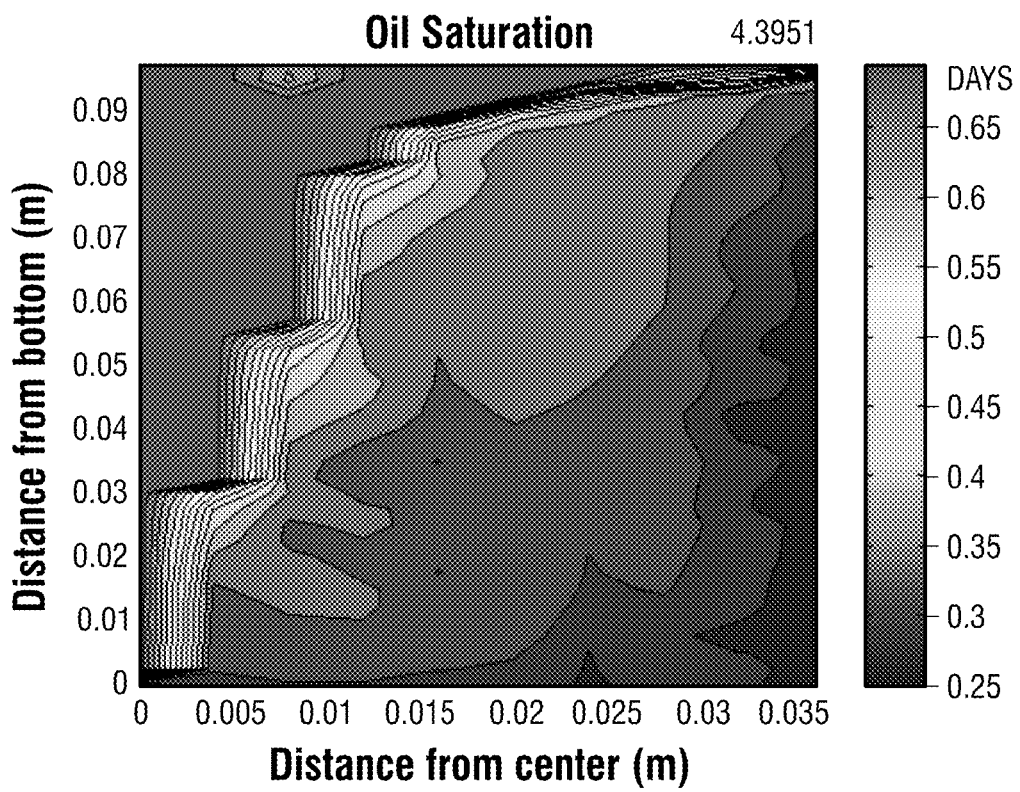
FIG. 3E is a computer simulation result showing oil saturation profile at 4.40 days.
Figure 3F:
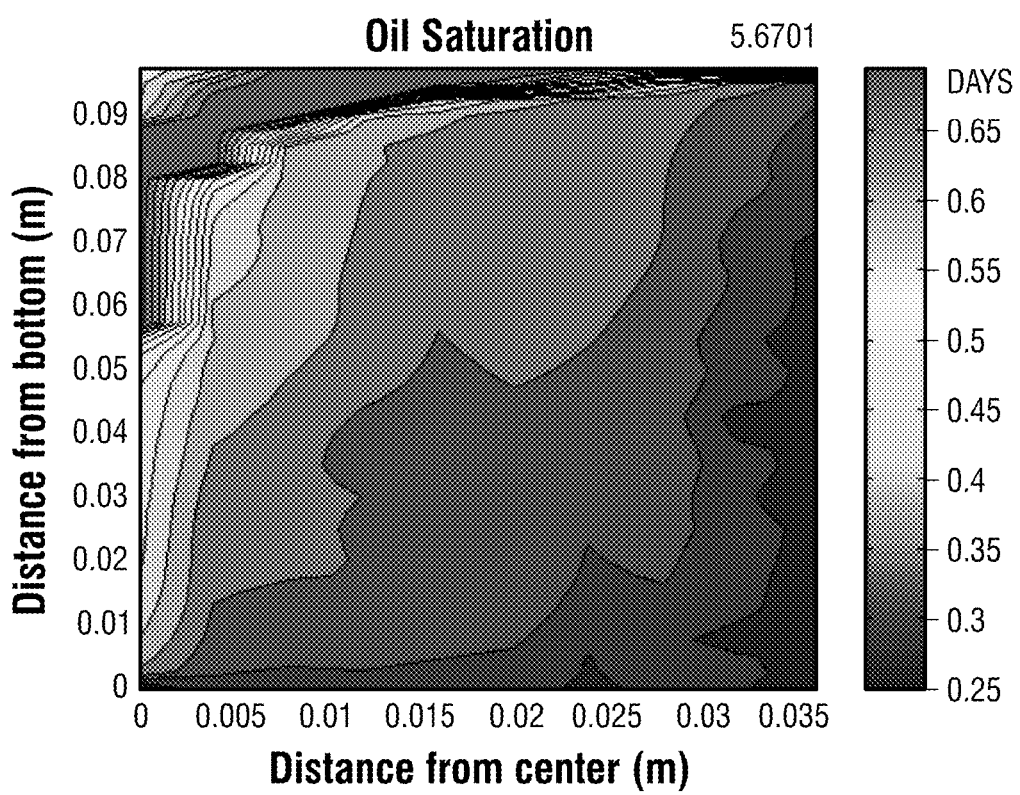
FIG. 3F is a computer simulation result showing oil saturation profile at 5.67 days.

FIG. 3 shows oil saturation profiles for the present process at various periods corresponding to 0.68 days (FIG. 3A), 1.10 days (FIG. 3B), 1.99 days (FIG. 3C), 3.27 days (FIG. 3D), 4.40 days (FIG. 3E) and 5.67 (FIG. 3F). Initially, the core is composed of two zones: one corresponding to the surfactant-invaded zone, because of gas compression, where the oil is at residual, and the other zone not invaded by surfactant water where the water saturation is at its residual. As time progresses, oil saturation profiles show that oil is invaded from the bottom by the surfactant water and is recovered from the top. For the case with no gas, the saturation profiles are similar except that the surfactant solution is not initially present inside the core. The simulation of this traditional case was validated with laboratory experiments.

Example 3

Figure 4A:
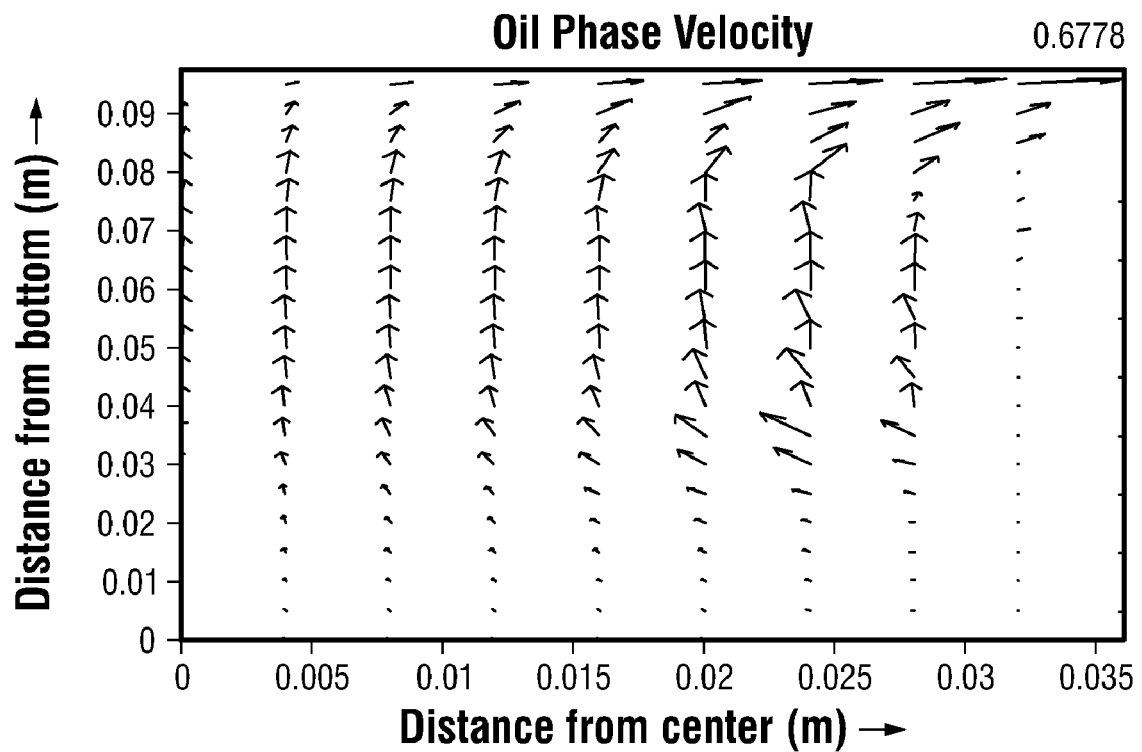
FIG. 4A is a computer simulation result showing oil phase velocity at 0.68 days.
Figure 4B:
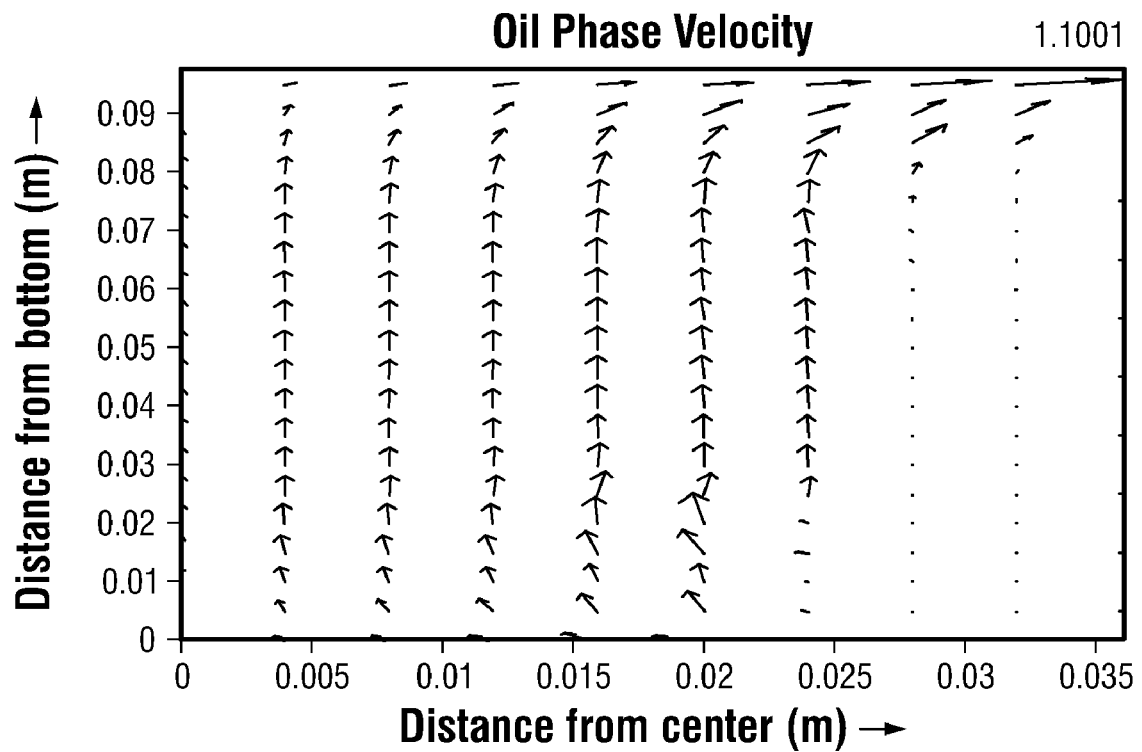
FIG. 4B is a computer simulation result showing oil phase velocity at 1.10 days.
Figure 4C:
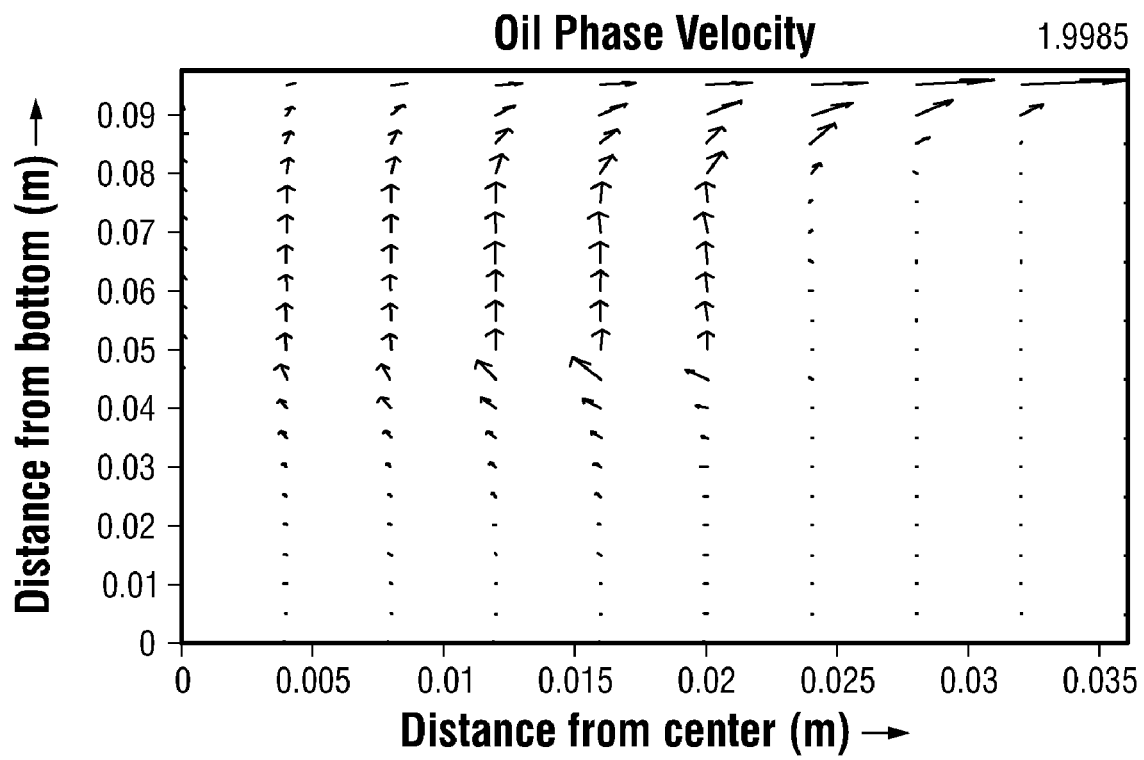
FIG. 4C is a computer simulation result showing oil phase velocity at 1.99 days.
Figure 4D:
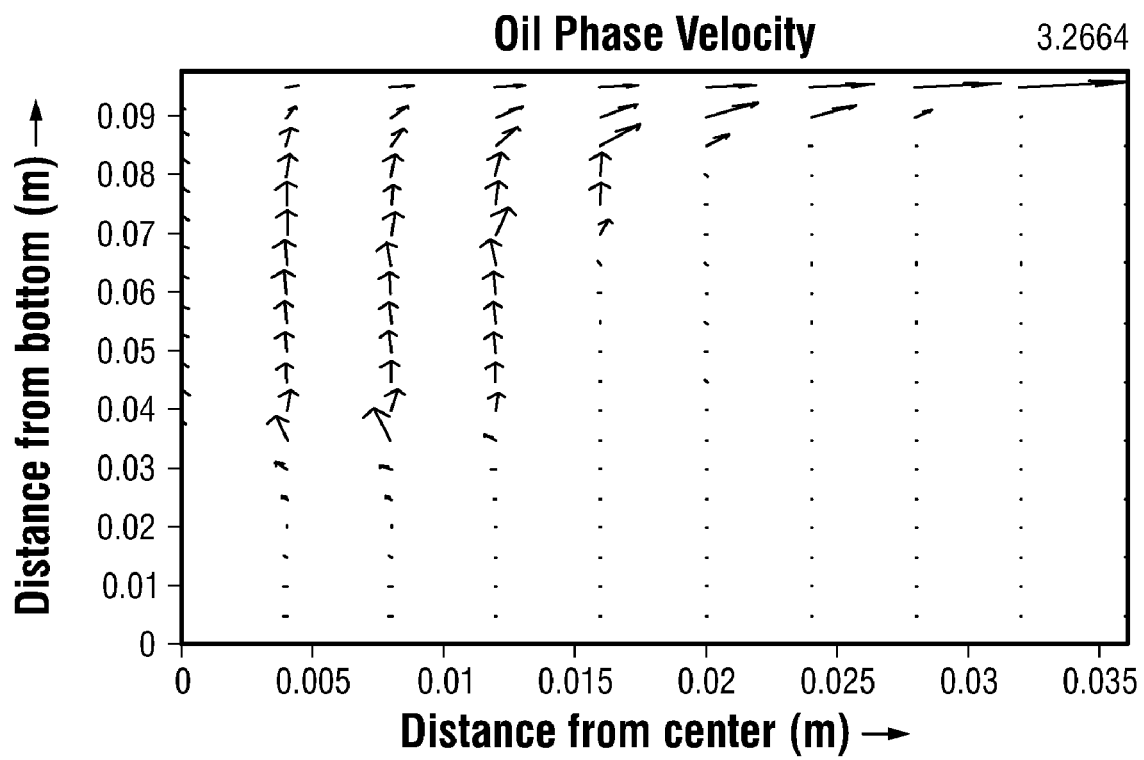
FIG. 4D is a computer simulation result showing oil phase velocity at 3.27 days
Figure 4E:
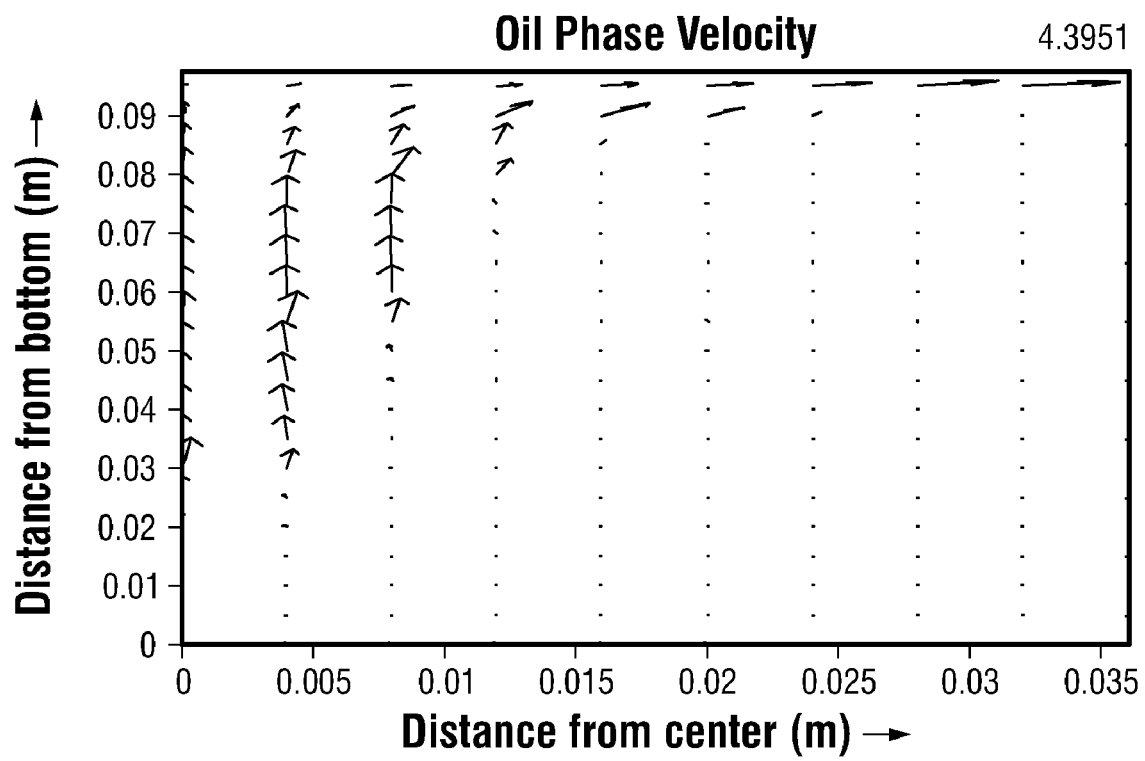
FIG. 4E is a computer simulation result showing oil phase velocity at 4.40 days.
Figure 4F:
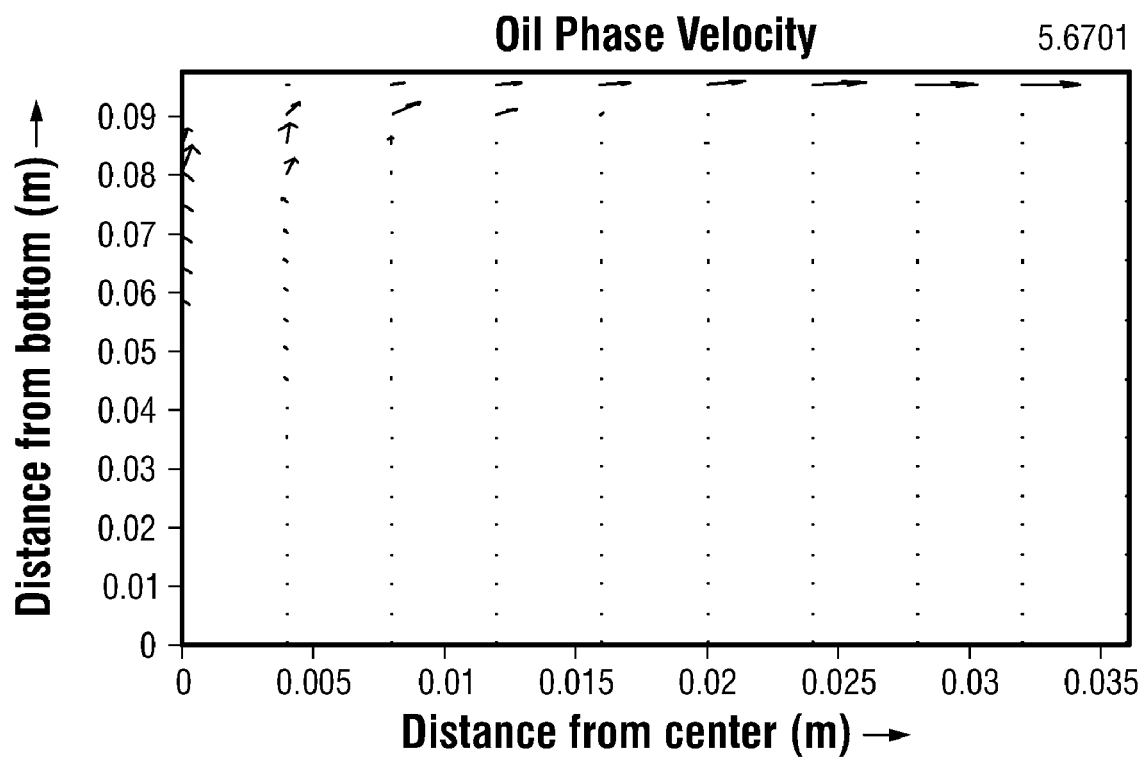
FIG. 4F is a computer simulation result showing oil phase velocity at 5.67 days.

FIG. 4 shows the oil phase velocity for the present process at different times corresponding to 0.68 days (FIG. 4A), 1.10 days (FIG. 4B), 1.99 days (FIG. 4C), 3.27 days (FIG. 4D), 4.40 days (FIG. 3E) and 5.67 (FIG. 4F). It can be seen from FIG. 4 that oil recovery is predominantly gravity-driven. Invasion of surfactant water into the initially oil-wet core changes the surfaces to preferentially water-wet, which increases oil relative permeability and lowers the interfacial tension and capillary pressures. Reduction of capillary forces and increase in oil relative permeability allows gravity to pull up the oil phase and produce it at the top of the core. This is the oil recovery mechanism for surfactants that lower the interfacial tension to ultralow values (e.g., $<10^{-2}$ mN/m). If the interfacial tension is higher (e.g., about 1 mN/m), then the oil-water flow is counter-current and driven by capillary pressure.

We claim:

1. A method for recovering liquid hydrocarbons from an underground reservoir, comprising
   (a) closing production wells, to form a sealed reservoir;
   (b) injecting a first surfactant solution into the reservoir, wherein the first surfactant increases the pressure in the reservoir;
   (c) maintaining the sealed reservoir, to maintain increased pressure;
   (d) opening production wells, wherein production wells remove the released liquid hydrocarbons;
   (e) injecting a second surfactant solution into the reservoir, wherein injecting a second surfactant solution comprises maintaining the increased pressure within the reservoir;

(f) removing liquid hydrocarbons, the first surfactant solution, and the second surfactant solution from the reservoir;

(g) recycling the first surfactant solution to step (b) and the second surfactant solution to step (e); and (h) recovering the liquid hydrocarbons.

2. The method of claim 1, wherein injecting the first surfactant solution into the reservoir comprises releasing liquid hydrocarbons from the matrix and rendering the matrix water-wet.

3. The method of claim 1, wherein the first surfactant solution comprises at least one surfactant selected from the group consisting of anionic surfactants, cationic surfactants, non-ionic surfactants, and silanes.

4. The method of claim 3, wherein the first surfactant solution further comprises at least one component selected from the group consisting of an alkali, an alkali salt, basic-ionic compounds, and combinations thereof.

5. The method of claim 1, wherein maintaining the sealed reservoir comprises allowing the first surfactant solution to penetrate through the reservoir.

6. The method of claim 5, wherein maintaining the sealed reservoir further comprises allowing the surfactant to flow the liquid hydrocarbons to the production wells.

7. The method of claim 1, wherein maintaining the sealed reservoir comprises maintaining an increased pressure within the reservoir.

8. The method of claim 1, wherein opening production wells comprises pumping liquid hydrocarbons and the first surfactant solution to the surface.

9. The method of claim 1, wherein the second surfactant solution is chosen from the group consisting of anionic surfactants, cationic surfactants, non-ionic surfactants, and silanes.

10. The method of claim 9, wherein the second surfactant solution further comprises at least one component selected from the group consisting of an alkali, an alkali salt, basic-ionic compounds, and combinations thereof.

11. The method of claim 1, wherein the first surfactant solution and the second surfactant solution are the same.

12. The method of claim 1, wherein the steps (a)-(h) are repeated until liquid hydrocarbon recovery drops below a predetermined quantity.

13. A method for accessing liquid hydrocarbons in a fractured reservoir, comprising:

injecting at least one surfactant solution into a fractured carbonate reservoir to render the reservoir matrix water-wet, wherein production wells fluidly coupled with the fractured reservoir are closed, and wherein the at least one surfactant solution decreases the gas space to increase pressure in the fractured reservoir;

maintaining the increased pressure in the fractured reservoir, wherein the increased pressure promotes surfactant penetration into matrix of the fractured reservoir;

opening at least one production well such that the liquid hydrocarbons and surfactants may be recovered from the fractured reservoir, wherein additional surfactant solutions are injected into the fractured reservoir to maintain pressure, and the recovered surfactants are recycled for re-injection into the fractured reservoir; and repeating the steps of injecting the surfactant solution, maintaining an increased pressure, and opening production wells until the hydrocarbons in the fractured reservoir are exhausted.

14. The method of claim 13, wherein the at least one surfactant solution is selected from the group consisting of anionic surfactants, cationic surfactants, non-ionic surfactants, and silanes.

15. The method of claim 13, wherein the at least one surfactant solution further comprises at least one component selected from the group consisting of an alkali, an alkali salt, basic-ionic compounds, and combinations thereof.

16. A method for underground liquid hydrocarbon management, comprising:

(a) injecting a first surfactant solution into an underground reservoir, wherein the at first surfactant releases liquid hydrocarbons from geological formations in the reservoir;

(b) forming a sealed reservoir, wherein the production wells in fluid communication with the underground reservoir are closed for a predetermined duration of time;

(c) opening at least one production well, to remove the released liquid hydrocarbons, the removed liquid hydrocarbon volume being offset by injecting a second surfactant solution into the reservoir;

(d) repeating steps (a) through (c) in alternate locations within the reservoir, to directionally control the flow of the first surfactant, the second surfactant, and the liquid hydrocarbons through the reservoir; and (e) recycling the first surfactant solution and the second surfactant solution.

17. The method of claim 16, wherein the first and second surfactant solutions are the same.

18. The method of claim 16, wherein the underground reservoir geological formations comprises one or more selected from the group consisting of connected porosities, fracture porosities, vugs, fractures, and styolites.

19. The method of claim 16, wherein the steps (a) through (e) are repeated until liquid hydrocarbon recovery drops below a predetermined quantity.

* * * * *